(12) United States Patent
Fuehrer

(10) Patent No.: US 9,904,656 B2
(45) Date of Patent: Feb. 27, 2018

(54) METHOD FOR ESTABLISHING A DRIVING PROFILE

(71) Applicant: Robert Bosch GmbH, Stuttgart (DE)

(72) Inventor: Thomas Fuehrer, Stuttgart-Weilimdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 729 days.

(21) Appl. No.: 13/892,972

(22) Filed: May 13, 2013

(65) Prior Publication Data

US 2013/0304334 A1 Nov. 14, 2013

(30) Foreign Application Priority Data

May 11, 2012 (DE) .................. 10 2012 207 859

(51) Int. Cl.
*G06F 17/00* (2006.01)
*G07C 5/00* (2006.01)
*G08G 1/0967* (2006.01)
*G08G 1/00* (2006.01)
*G08G 1/01* (2006.01)

(52) U.S. Cl.
CPC ............. *G06F 17/00* (2013.01); *G07C 5/008* (2013.01); *G08G 1/0112* (2013.01); *G08G 1/0129* (2013.01); *G08G 1/096716* (2013.01); *G08G 1/096725* (2013.01); *G08G 1/096741* (2013.01); *G08G 1/096775* (2013.01); *G08G 1/20* (2013.01)

(58) Field of Classification Search
CPC ........... G07C 5/08; G07C 5/008; G06F 17/00; G08G 1/104; G08G 1/164; G08G 1/096741; G08G 1/096775; G08G 1/20; G08G 1/0112; G08G 1/0129; G08G 1/096716; G08G 1/096725
USPC .......................................................... 701/51
See application file for complete search history.

(56) References Cited

U.S. PATENT DOCUMENTS 8,280,560 B2 * 10/2012 Huang et al. .................... 701/1
8,478,499 B2 7/2013 Rupp et al.
2008/0167820 A1 * 7/2008 Oguchi et al. ................ 701/301
2010/0030434 A1 * 2/2010 Okabe et al. .................. 701/48

(Continued)

FOREIGN PATENT DOCUMENTS

DE 100 56 756 A1 5/2002
WO 2008/107514 A1 9/2008

*Primary Examiner* — Courtney D Heinle
(74) *Attorney, Agent, or Firm* — Norton Rose Fulbright US LLP; Gerard Messina

(57) ABSTRACT

A method for establishing a driving profile includes recording a value of an operating characteristic of a motor vehicle with the aid of a sensor situated in the motor vehicle at a first point in time, linking the value to a piece of location information indicating a position of the motor vehicle to obtain a linked piece of information, transferring the linked piece of information to a server, evaluating a plurality of linked pieces of information to ascertain a driving profile which includes location-dependent values of the operating characteristic, transferring the driving profile to the motor vehicle, and ascertaining a deviation between a value of the operating characteristic of the motor vehicle and a value of the operating characteristic included in the driving profile at a position of the motor vehicle at a second point in time.

19 Claims, 2 Drawing Sheets

(56) References Cited

U.S. PATENT DOCUMENTS

2011/0210867 A1\* 9/2011 Benedikt ...................... 340/905
2011/0301802 A1 12/2011 Rupp et al.
2012/0296512 A1\* 11/2012 Lee et al. .................... 701/29.3

\* cited by examiner

METHOD FOR ESTABLISHING A DRIVING PROFILE

CROSS REFERENCE

The present application claims the benefit under 35 U.S.C. § 119 of German Patent Application No. DE 102012207859.2 filed on May 11, 2012, which is expressly incorporated herein by reference in its entirety.

FIELD

The present invention relates to a method for establishing a driving profile.

BACKGROUND INFORMATION

Motor vehicles are conventionally equipped with radar systems. Such radar systems may be long- or medium-range radar systems, for example. The radar systems may be used to ascertain a distance between a motor vehicle and a preceding and/or a following other motor vehicle. The ascertainment of the distance may be used in the context of a safety function to recognize an imminent collision and to prevent same by outputting a warning to a vehicle driver and/or by automatically assisting the driver with braking. Alternatively or additionally, the distance ascertainment may also be used for cruise and/or distance control in a driver assistance system which is designed to intervene in an engine management and/or a brake management of the motor vehicle.

Likewise, motor vehicles are conventionally equipped with navigation systems which are designed to ascertain a present position of a motor vehicle. The position determination may in this case take place by using GPS signals, for example.

SUMMARY

An object of the present invention is to provide an improved method for establishing a driving profile.

An example method in accordance with the present invention for establishing a driving profile includes recording a value of an operating characteristic of a motor vehicle with the aid of a sensor situated in the motor vehicle at a first point in time, linking the value to a piece of location information indicating a position of the motor vehicle to obtain a linked piece of information, transferring the linked piece of information to a server, evaluating a plurality of linked pieces of information to ascertain a driving profile which includes location-dependent values of the operating characteristic, transferring the driving profile to the motor vehicle, and ascertaining a deviation between a value of the operating characteristic of the motor vehicle and a value of the operating characteristic included in the driving profile at a position of the motor vehicle at a second point in time. Advantageously, this example method allows an optimized driving profile to be established and the optimized driving profile to be transmitted to the motor vehicle. Advantageously, only data which are ascertained anyway in a motor vehicle equipped with a sensor and a device for position determination are necessary to establish the optimized driving profile. In this way the example method may be advantageously implemented with little effort.

In one preferred specific embodiment of the method, the method includes another step for outputting a piece of information regarding the deviation to a vehicle driver of the motor vehicle. Advantageously, the vehicle driver of the motor vehicle may be urged in this way to be guided by the driving behavior predefined by the driving profile. Advantageously, an accident risk may be considerably reduced in this way. Another advantage may be that the driver is prevented from unintentionally or intentionally committing violations of the law.

In another preferred specific embodiment of the method, this method includes a further step for controlling a driver assistance system of the motor vehicle in such a way that the deviation is reduced. Advantageously, it is thus ensured that the motor vehicle is driven according to a driving behavior predefined by the driving profile. In this way, it is advantageously possible to reduce an accident risk in a particularly efficient manner. Likewise, intentional or unintentional violations of the law are advantageously prevented. For example, speeding may be advantageously avoided or reduced.

In one preferred specific embodiment of the method, the operating characteristic is a speed or an acceleration, or a braking deceleration of the motor vehicle, a distance between the motor vehicle and a preceding or a following other vehicle, or a selected gear stage of the motor vehicle. Advantageously, all these operating characteristics may be advantageously used to establish an optimized driving profile.

In one advantageous specific embodiment of the method, the driving profile includes location-dependent values of multiple operating characteristics. Advantageously, the driving profile then reproduces an optimized driving behavior in a particularly precise manner.

In one preferred specific embodiment of the method, a plurality of motor vehicles transmits linked pieces of information to the server. Advantageously, a particularly large variety of linked pieces of information is then available for the evaluation of the linked pieces of information and the ascertainment of the driving profile. This advantageously allows the statistical connections and frequencies to be taken into consideration. The evaluation of a larger number of linked pieces of information also allows the erroneous or corrupted data to be filtered or averaged out.

In one refinement of the method, the driving profile is transferred to a plurality of motor vehicles. The motor vehicles may in this case be the motor vehicles of the same vehicle fleet, for example. Advantageously, the plurality of motor vehicles and vehicle drivers of the plurality of motor vehicles may then be urged to apply a uniform driving behavior.

In one advantageous specific embodiment of the method, a value of the operating characteristic included in the driving profile is an average value of the values of the operating characteristic transmitted to the server. Advantageously, the optimized value of the operating characteristic included in the driving profile is then formed as an average of typical values of the operating characteristic.

In one refinement of the method, the location-dependent values of the operating characteristic included in the driving profile are selected in such a way that a maximally admissible speed is not exceeded and/or a minimum distance between a motor vehicle and a preceding or a following other motor vehicle is not undershot. Advantageously, the driving profile is then optimized during its ascertainment in such a way that an operation of a motor vehicle according to the values of the operating characteristic included in the driving profile results in a particularly safe and law-conforming driving behavior. In this way, an accident risk may be advantageously considerably reduced.

In one advantageous specific embodiment of the method, the sensor is a radar sensor. Advantageously, radar sensors are suitable for the ascertainment of a distance between a motor vehicle and the surrounding other vehicles. Advantageously, motor vehicles are in many cases equipped with such sensors anyway. In this way the method may be advantageously implemented without great additional effort.

The present invention is now explained in greater detail on the basis of the figures.

DETAILED DESCRIPTION OF EXAMPLE EMBODIMENTS

Figure 1:
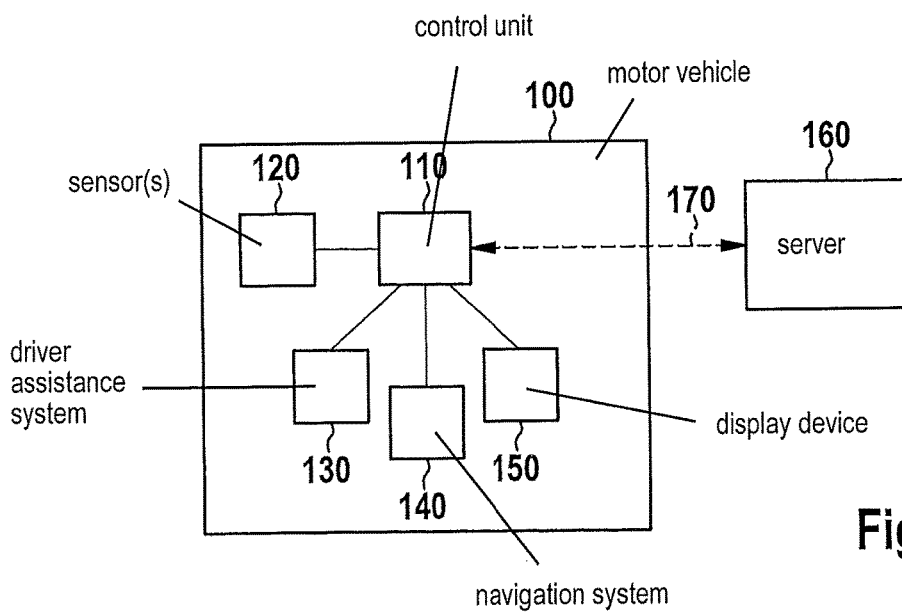
FIG. 1 shows a schematic block diagram of a motor vehicle and a server.

FIG. 1 shows a schematic illustration of a motor vehicle 100. Motor vehicle 100 may be a passenger car, for example. Motor vehicle 100 may, however, also be a delivery van, a truck, or another type of motor vehicle. Motor vehicle 100 may belong to a fleet of related motor vehicles. For example, motor vehicle 100 may be part of a fleet of delivery vehicles of a forwarding company or a parcel service.

Motor vehicle 100 has a control unit 110. Control unit 110 is preferably implemented as a combination of hardware and software components. For example, control unit 110 may include a microcontroller or a microcomputer on which a program runs. Control unit 110 may also include volatile and non-volatile data memories.

Motor vehicle 100 also has at least one sensor 120. Sensor 120 may be used to ascertain a value of an operating characteristic of motor vehicle 100. The term "operating characteristic" denotes in the context of this description each variable and piece of information which characterizes and quantifies an operating mode, an operation type, or the operation of motor vehicle 100 in general.

The operating characteristic of motor vehicle 100 may be a speed of motor vehicle 100, for example. In this case, sensor 120 is designed to ascertain a speed of the motor vehicle. The operating characteristic of motor vehicle 100 may also be an acceleration or a braking deceleration of the motor vehicle. In this case, sensor 120 is designed to ascertain an acceleration or a braking deceleration of motor vehicle 100. The operating characteristic of motor vehicle 100 may also be a selected gear stage of a transmission of the motor vehicle. In this case, sensor 120 is designed to determine the selected gear stage of motor vehicle 100.

The operating characteristic of motor vehicle 100 may also be a distance between motor vehicle 100 and a preceding other motor vehicle or another motor vehicle which follows motor vehicle 100. In this case, sensor 120 is designed to ascertain such a distance. Sensor 120 is then preferably designed as a radar sensor, e.g., as a long- or medium-range radar sensor.

Sensor 120 may also be a video camera, a stereo video camera, a scanning lidar (light detection and ranging) sensor, or a scanning radar sensor. Such sensors are also suitable for analyzing the surroundings of motor vehicle 100 and for ascertaining distances between motor vehicle 100 and the surrounding other motor vehicles.

Vehicle 100 may also have multiple sensors 120. Multiple sensors 120 are then preferably used to ascertain values of multiple different operating characteristics of motor vehicle 100. For example, motor vehicle 100 may have a first radar sensor for ascertaining a distance between motor vehicle 100 and a preceding other motor vehicle, a second radar sensor for ascertaining a distance between motor vehicle 100 and a following other motor vehicle, and a speed sensor for ascertaining a speed of motor vehicle 100.

In the exemplary specific embodiment illustrated in FIG. 1, motor vehicle 100 moreover includes a driver assistance system 130. The driver assistance system may also be referred to as an adaptive cruise control (ACC). Driver assistance system 130 may be used to execute an automatic cruise and/or distance control of motor vehicle 100. For this purpose, driver assistance system 130 may be designed to carry out interventions in an engine management and/or a brake management of motor vehicle 100. Driver assistance system 130 may also be designed to receive values, ascertained by sensor 120, of one or multiple operating characteristic(s) of motor vehicle 100. In particular, driver assistance system 130 may be designed to receive distance values of a radar sensor. In one simplified specific embodiment of motor vehicle 100, driver assistance system 130 may, however, also be dispensed with.

Motor vehicle 100 also includes a navigation system 140. Navigation system 140 is designed to ascertain a position of motor vehicle 100. Navigation system 140 may, for example, be designed to determine the position of motor vehicle 100 by receiving a GPS signal.

Motor vehicle 100 also includes a display device 150. Display device 150 is used to display information to a vehicle driver of motor vehicle 100. Display device 150 may be designed as a monitor or as a small light, for example. Motor vehicle 100 may also have multiple display devices 150. Display device 150 may also be part of driver assistance system 130 or navigation system 140 or be used by driver assistance system 130 and/or navigation system 140.

Control unit 110 of motor vehicle 100 is connected to sensor 120, driver assistance system 130, navigation system 140, and display device 150. Using these connections, control unit 110 may exchange data and information with sensor 120, driver assistance system 130, navigation system 140, and display device 150, and control sensor 120, driver assistance system 130, navigation system 140, and display device 150.

The schematic illustration of FIG. 1 also shows a server 160. Server 160 is situated outside of motor vehicle 100. Server 160 may be a computer in a data processing center, for example. Server 160 may also be implemented by a plurality of interconnected computers which are situated in one or multiple data processing center(s). Server 160 may be part of a cloud infrastructure or part of a service of a social network. If motor vehicle 100 is part of a vehicle fleet, server 160 may be a server of an operator of the vehicle fleet, in particular.

Control unit 110 of motor vehicle 100 is designed to communicate with server 160 via a bidirectional communication connection 170. Bidirectional communication connection 170 is preferably a wireless communication connection. For example, bidirectional communication connection 170 may be implemented as a connection according to an internet protocol via a mobile radio network. For this purpose, control unit 110 is then connected or equipped with suitable transceiver units.

Figure 2:
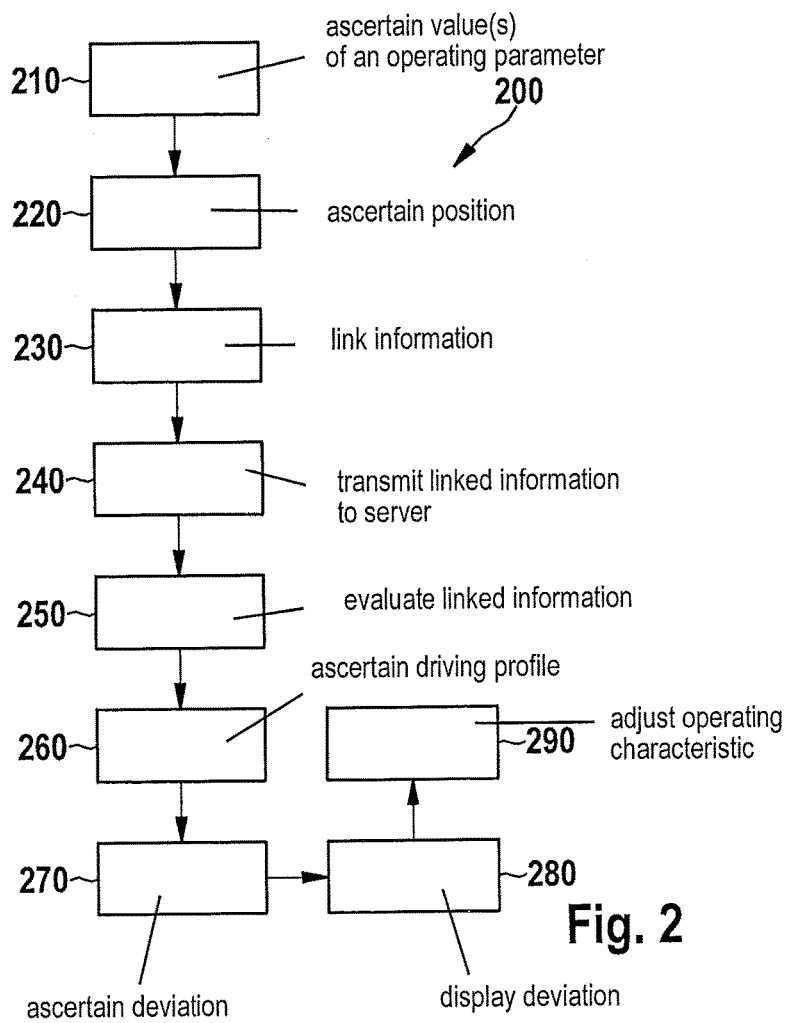
FIG. 2 shows a schematic flow chart of a method for establishing a driving profile.

FIG. 2 shows a schematic flow chart of a method 200 for establishing a driving profile. Method 200 is carried out partially by control unit 110 of motor vehicle 100 and partially by server 160, as will be explained in the following.

In a first method step 210, control unit 110 ascertains a value of an operating characteristic of motor vehicle 100. For this purpose, control unit 110 receives a value ascertained by sensor 120. Control unit 110 may also receive multiple values ascertained by multiple sensors 120.

In first method step 210, control unit 110 may, for example, record a speed of motor vehicle 100 as well as a distance of motor vehicle 100 from another motor vehicle which precedes motor vehicle 100.

In a second method step 220, control unit 110 ascertains a position of motor vehicle 100. The position of motor vehicle 100 is ascertained preferably simultaneously with the value of the operating characteristic of motor vehicle 100 recorded in first method step 210. Control unit 110 ascertains the position of motor vehicle 100 with the aid of navigation system 140. The ascertained position of motor vehicle 100 may also be referred to as a piece of location information.

In a third method step 230, control unit 110 links the value of the operating characteristic of motor vehicle 100 recorded in first method step 210 to the piece of location information ascertained in second method step 220 to obtain a linked piece of information.

Figure 3:
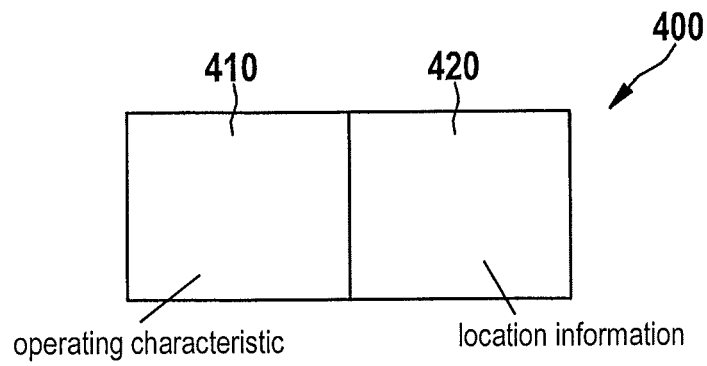
FIG. 3 shows a schematic illustration of a linked piece of information.

FIG. 3 shows a schematic illustration of a linked piece of information 400. Linked piece of information 400 includes a value 410 of an operating characteristic of motor vehicle 100 ascertained in first method step 210 and a piece of location information 420, ascertained in second method step 220, which indicates a position of motor vehicle 100 at that point in time at which value 410 of the operating characteristic was recorded.

In a fourth method step 240, control unit 110 transmits linked piece of information 400 obtained in the third method step to server 160 via bidirectional communication connection 170.

First method step 210, second method step 220, third method step 230, and fourth method step 240 are preferably repeated multiple times. Particularly preferably, method steps 210, 220, 230, 240 are repeated continuously, e.g., once per second or once per minute, while motor vehicle 100 is driving. In this way, a plurality of location-dependent values 410 of one or multiple operating characteristic(s) of motor vehicle 100 is transmitted to server 160.

If motor vehicle 100 is part of a fleet of related motor vehicles, all motor vehicles 100 of the vehicle fleet preferably repeatedly carry out first method step 210, second method step 220, third method step 230, and fourth method step 240. In this way, location-dependent values 410 of one or multiple operating characteristic(s) of multiple motor vehicles 100 having different vehicle drivers are transferred to server 160.

In a fifth method step 250, server 160 evaluates the plurality of linked pieces of information 400 transferred to server 160 to ascertain a driving profile which includes location-dependent values of one or multiple operating characteristic(s) of motor vehicle 100.

Figure 4:
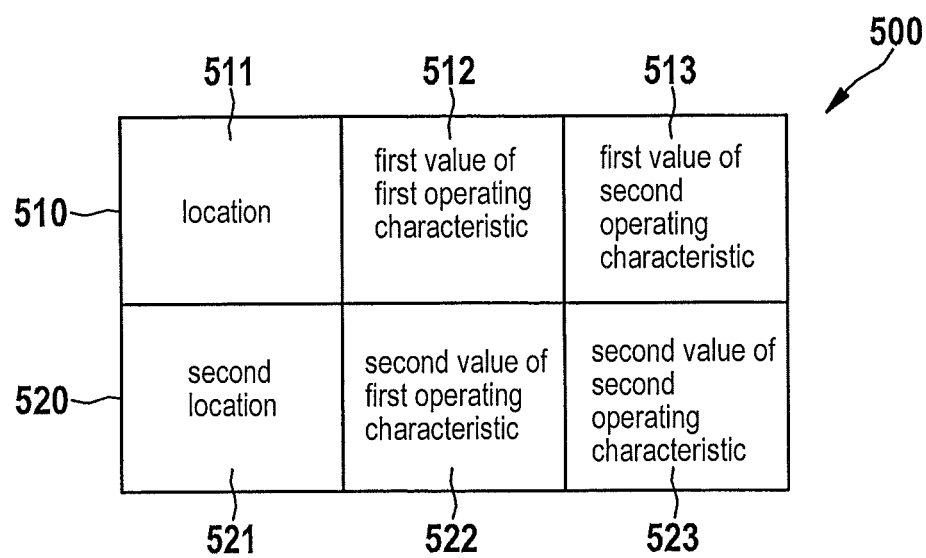
FIG. 4 shows a schematic illustration of a part of a driving profile.

FIG. 4 shows a schematic illustration of a driving profile 500 which is ascertained by server 160. Driving profile 500 is established as a table or a list having a first entry 510 and a second entry 520. First entry 510 of driving profile 500 includes a first piece of location information 511, a first value 512 of a first operating characteristic, and a first value 513 of a second operating characteristic. Second entry 520 of driving profile 500 includes a second piece of location information 521, a second value 522 of the first operating characteristic, and a second value 523 of the second operating characteristic. First values 512, 513 of the first and the second operating characteristics are in this case assigned to piece of location information 511. Second values 522, 523 are assigned to second piece of location information 512. Driving profile 500 preferably includes a large number of other entries 510, 520 in which other location-dependent values of the first and the second operating characteristics are indicated. Driving profile 500 may also include values of only one operating characteristic or, preferably, values of more than two operating characteristics.

Driving profile 500 represents an optimized driving profile for driving or operating motor vehicle 100. If motor vehicle 100 is driven in such a way that in every location in which motor vehicle 100 drives the values of the operating characteristics of motor vehicle 100 approximately correspond to the values of the operating characteristics indicated for this location in driving profile 500, there is a particularly low risk for an accident or a violation of traffic regulations.

In fifth method step 250, server 160 may, for example, form average values from the values of an operating characteristic transmitted for every location to server 160 during the evaluation of the plurality of linked pieces of information 400, analyze statistical connections and frequencies, and harmonize linked pieces of information 400 collected by server 160. Linked pieces of information 400 obtained by server 160 may also be compared to values stored in a database of server 160 regarding prescribed or recommended values of the operating characteristics. For example, location-dependent speed values received by server 160 may be compared to the maximum speeds allowed in these locations. Driving profile 500 may then be set up in such a way that maximally admissible speeds are not exceeded in any location. Driving profile 500 may also be set up in such a way that an established minimum distance between motor vehicle 100 and preceding or following other motor vehicles is not undershot in any location. With the aid of these and similar measures, driving profile 500 is established by server 160 in such a way that the actual values indicated by linked pieces of information 400 are optimized to obtain the setpoint values included in driving profile 500.

In a sixth method step 260, driving profile 500 ascertained by server 160 in fifth method step 250 is transferred to motor vehicle 100. The transfer preferably takes place via bidirectional communication connection 170. If motor vehicle 100 is part of a vehicle fleet of related motor vehicles, driving profile 500 may be transferred to multiple motor vehicles 100 of the vehicle fleet.

In a seventh method step 270, control unit 110 of motor vehicle 100 ascertains a deviation between a value of an operating characteristic of motor vehicle 100, which control unit 110 makes sensor 120 ascertain, and a value of this operating characteristic, included in driving profile 500, for the position in which motor vehicle 100 is located at this point in time. In seventh method step 270, control unit 110 thus ascertains with the aid of sensor 120 a value of an operating characteristic of motor vehicle 100. In addition, control unit 110 ascertains with the aid of navigation system 140 a piece of location information of motor vehicle 100, which indicates a present position of motor vehicle 100. Control unit 110 retrieves an entry 510, 520, whose pieces of location information 511, 512 correspond to the piece of location information ascertained by navigation system 140, from driving profile 500 and retrieves a value 512, 513, 522, 523 of the operating characteristic from this entry 510, 520. Control unit 110 compares the value of the operating characteristic ascertained by sensor 120 to the value of the operating characteristic retrieved from driving profile 500 and ascertains a deviation.

In an eighth method step 280, control unit 110 may display via display device 150 to the vehicle driver of motor vehicle 100 a deviation ascertained in seventh method step 270. In this way, the vehicle driver of motor vehicle 100 may be directed to adapt the value of the operating characteristic to the optimal value of the operating characteristic included in driving profile 500. If the operating characteristic is a speed of motor vehicle 100, control unit 110 may, for example, display to the vehicle driver in eighth method step 280 that the present speed of motor vehicle 100 is above the optimal speed of motor vehicle 100 included in driving profile 500. The vehicle driver may then decelerate motor vehicle 100.

In a ninth method step 290, which is alternative or additional to eighth method step 280, control unit 110 may direct driver assistance system 130 to automatically adjust the value of operating characteristic to the optimal value of the operating characteristic retrieved from driving profile 500. Driver assistance system 130 may then automatically decelerate motor vehicle 100, for example.

In one general specific embodiment, method 200 is used for utilizing sensors 120, which are included in motor vehicle 100 anyway, to collect driving behaviors and driving profiles of individual vehicle drivers of a fleet of motor vehicles 100. These pieces of information include, for example, speed, distance, acceleration, and braking information and, if necessary, other pieces of information such as a gear stage of a transmission. The profiles of individual vehicle drivers are tagged with a traveled road section and stored in a map. All these pieces of information are collected centrally via server 160, e.g., data cloud services or a social network of the fleet operator or its service provider, for example. The collected data may now be analyzed (e.g., statistical connections, frequencies) and harmonized (e.g., speeds of individual drivers yield an average speed). Furthermore, the profiles are now optimized to increase the traffic safety or avoid fines and punishments. In this way, it is, for example, possible to find the optimal speed (e.g., average speed) or also to find out about the exceedances compared to the speed limits present in a location and adapted for an ideal profile. In this way, a new driving profile is established centrally for certain road sections. The method now allows the transmission of these ideal driving profiles (speed, distance, acceleration and braking behavior) to all fleet drivers or vehicles, which are appropriately equipped with safety and ACC sensors, via the cloud services or social networks of the fleet operator.

This results in all fleet drivers now being urged to comply with the new driving profiles via warnings on the display/navigation device or via ACC. In this way, the accident risk is significantly reduced or fines or the suspension of the driver's license is/are avoided.

What is claimed is:

1. A method for establishing a driving profile, comprising:
   recording, by a processing device of a control unit, a value of an operating characteristic of a motor vehicle ascertained at a first point in time with the aid of a sensor situated in the motor vehicle;
   linking, by the processing device of the control unit, the recorded value of the operating characteristic to a piece of location information indicating a position of the motor vehicle to obtain a linked piece of information;
   transferring, by the processing device of the control unit, the linked piece of information to a server;
   evaluating, by a processing device of the server, a plurality of linked pieces of information to ascertain a driving profile which includes location-dependent values of the operating characteristic;
   transferring, by the processing device of the server, the driving profile to the motor vehicle; and
   ascertaining, by the processing device of the control unit, a deviation between a value of the operating characteristic of the motor vehicle and a value of the operating characteristic included in the driving profile at a position of the motor vehicle at a second point in time;
   wherein the operating characteristic is one of a speed, an acceleration, a braking deceleration of the motor vehicle, a distance between the motor vehicle and a preceding or a following other motor vehicle, or a selected gear stage of the motor vehicle.

2. The method as recited in claim 1, further comprising:
   outputting, by the processing device of the control unit, a piece of information regarding the deviation to a vehicle driver of the motor vehicle.

3. The method as recited in claim 1, further comprising:
   controlling, by the processing device of the control unit, a driver assistance system of the motor vehicle in such a way that the deviation is reduced.

4. The method as recited in claim 1, wherein the driving profile includes location-dependent values of multiple operating characteristics.

5. The method as recited in claim 1, wherein a plurality of motor vehicles transmit linked pieces of information to the server.

6. The method as recited in claim 1, wherein the driving profile is transmitted to a plurality of motor vehicles.

7. The method as recited in claim 1,
   wherein the location dependent values of the operating characteristic included in the driving profile are selected in such a way that at least one of: a maximally admissible speed is not exceeded, and a minimum distance between a motor vehicle and a preceding or a following other motor vehicle is not undershot.

8. The method as recited in claim 1, wherein the sensor is a radar sensor.

9. The method as recited in claim 1, wherein the processing device of the control unit:
   records multiple operating characteristics; and
   links the respective recorded values of the multiple operating characteristics each to a piece of location information indicating a position of the motor vehicle to obtain linked pieces of information.

10. The method as recited in claim 2, wherein the outputted piece of information is accompanied by an output urging a driver of the motor vehicle to follow a driving behavior predefined by the driving profile.

11. The method as recited in claim 1, wherein the sensor is one of a video camera and a scanning lidar.

12. The method as recited in claim 1, wherein the server is situated outside of the motor vehicle.

13. The method as recited in claim 1, wherein a bidirectional communication connection is implemented between the server and the control unit for transferring the linked piece of information and for transferring the driving profile.

14. The method as recited in claim 1, wherein a set of steps, the set of steps including recording the value of the operating characteristic, linking the recorded value of the operating characteristic to the piece of location information, and transferring the linked piece of information to the server, is repeated continuously.

15. The method as recited in claim 1, wherein the driving profile is established as a table or a list having at least two entries for the operating characteristic, each entry including location information associated with a value of the operating characteristic.

16. The method as recited in claim 1, wherein the evaluating the plurality of linked pieces of information includes an analysis of statistical connections and frequencies that have been collected by the server.

17. The method as recited in claim 1, wherein the evaluating the plurality of linked pieces of information includes comparing the linked pieces of information to values stored in a database of the server having prescribed values of the operating characteristics.

18. The method as recited in claim 1, further comprising:
automatically adjusting, by the processing device of the control unit, the value of the operating characteristic to the value of the operating characteristic t from the driving profile.

19. A method for establishing a driving profile, comprising:
recording, by a processing device of a control unit, a value of an operating characteristic of a motor vehicle ascertained at a first point in time with the aid of a sensor situated in the motor vehicle;
linking, by the processing device of the control unit, the recorded value of the operating characteristic to a piece of location information indicating a position of the motor vehicle to obtain a linked piece of information;
transferring, by the processing device of the control unit, the linked piece of information to a server;
evaluating, by a processing device of the server, a plurality of linked pieces of information to ascertain a driving profile which includes location-dependent values of the operating characteristic;
transferring, by the processing device of the server, the driving profile to the motor vehicle; and
ascertaining, by the processing device of the control unit, a deviation between a value of the operating characteristic of the motor vehicle and a value of the operating characteristic included in the driving profile at a position of the motor vehicle at a second point in time;
wherein a value of the operating characteristic included in the driving profile is an average value of values of the operating characteristic transmitted to the server.

* * * * *